(12) United States Patent
Turner

(10) Patent No.: US 6,886,330 B1
(45) Date of Patent: May 3, 2005

(54) HYDROFORMED TORQUE CONVERTER FLUID COUPLING MEMBER

(75) Inventor: Gary A. Turner, Pinckney, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/717,117

(22) Filed: Nov. 19, 2003

(51) Int. Cl.[7] .............................................. F16D 33/00

(52) U.S. Cl. ........................ 60/330; 60/364; 416/197 C

(58) Field of Search .......................... 60/330, 361, 362, 60/364; 415/73, 92; 416/197 C, 213 A, 229 R

(56) References Cited

U.S. PATENT DOCUMENTS

| | | | |
|---|---|---|---|
| 5,065,509 A | * | 11/1991 | Sahashi ....................... 60/330 |
| 5,771,691 A | | 6/1998 | Kirkwood et al. ............ 60/345 |
| 6,360,533 B1 | | 3/2002 | Turner et al. ................. 60/634 |
| 6,532,639 B2 | | 3/2003 | Ni et al. .................... 29/421.1 |

* cited by examiner

*Primary Examiner*—Thomas E. Lazo
(74) *Attorney, Agent, or Firm*—Leslie C. Hodges

(57) ABSTRACT

A method of manufacturing a torque converter fluid coupling member includes forming a plurality of hollow tubes having first and second ends and connecting the plurality of tubes together side-by-side in an annular array. Fluid may be carried through each tube from the first end to the second end, thereby forming the fluid coupling member. The fluid coupling member may be a turbine or a pump of a torque converter.

19 Claims, 3 Drawing Sheets

HYDROFORMED TORQUE CONVERTER FLUID COUPLING MEMBER

TECHNICAL FIELD

The present invention relates to a torque converter fluid coupling member including a plurality of hydroformed hollow tubes connected together in an annular array to form a fluid coupling.

BACKGROUND OF THE INVENTION

It is known in the art to provide a hydrodynamic torque converter for an automotive transmission with fluid coupling members, including an impeller (pump) and a turbine, which together with a stator include blades defining circulation passages that transmit power from the impeller to the turbine for driving a vehicle. The passages are configured in a known manner so that engine torque delivered to the impeller is increased in the turbine when operating at lower speeds. The stator is mounted on a one-way clutch so that the stator may rotate with the fluid flow as torque multiplication is reduced and the turbine speed increases to approach the rotational speed of the impeller.

Conventionally, the coupling members have been formed as castings or fabricated sheet metal members. A traditional sheet metal turbine assembly includes an inner shell, an outer shell and a plurality of stamped blades. During fabrication, the inner and outer shells are stamped and slotted. The blades are formed by multi-station stamping and stacked for assembly. An automatic blade setter inserts the blades serially into the outer shell. The inner shell is then assembled to the blades and the blade tabs are rolled down against the shell. Finally, the assembly is brazed to fill in gaps between the shells and the blades. However, the brazing process does not necessarily fill the gaps between the shells and the blades with 100 percent effectiveness, which may adversely affect performance.

SUMMARY OF THE INVENTION

The invention provides a torque converter fluid coupling member, such as a turbine or pump, which includes a plurality of hydroformed hollow tubes connected together in an annular arrangement to form the fluid coupling. The invention provides a simplified structure which eliminates the prior art inner shell, blades, tabs, tab rollers, brazing operations, progressive machines for stamping inner and outer shells, and blade setter equipment.

A method of manufacturing a torque converter fluid coupling member in accordance with the invention includes: (a) forming a plurality of hollow tubes having first and second ends; and (b) connecting the plurality of tubes together side-by-side in an annual array such that fluid may be carried through each tube from the first end to the second end, thereby forming the fluid coupling member. The fluid coupling member may be a turbine or a pump.

Preferably, the hollow tubes are formed by hydroforming, and adjacent tubes are connected by tack welding. The first end of each tube is positioned at an inner periphery of the annular array and a second end of each tube is positioned at an outer periphery of the annular array. The tubes are preferably a low carbon steel, such as SAE 1010 or 1020, having a carbon content between 0.06 and 0.10 percent. Each coupling preferably includes a prime number of tubes, such as 29 or 31.

A turbine hub may also be riveted and/or welded to the tubes.

Accordingly, a torque converter fluid coupling member of the invention includes a plurality of hollow steel tubes connected together sideby-side in an annular array wherein fluid may be carried through each tube from one end to another to form the fluid coupling member.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
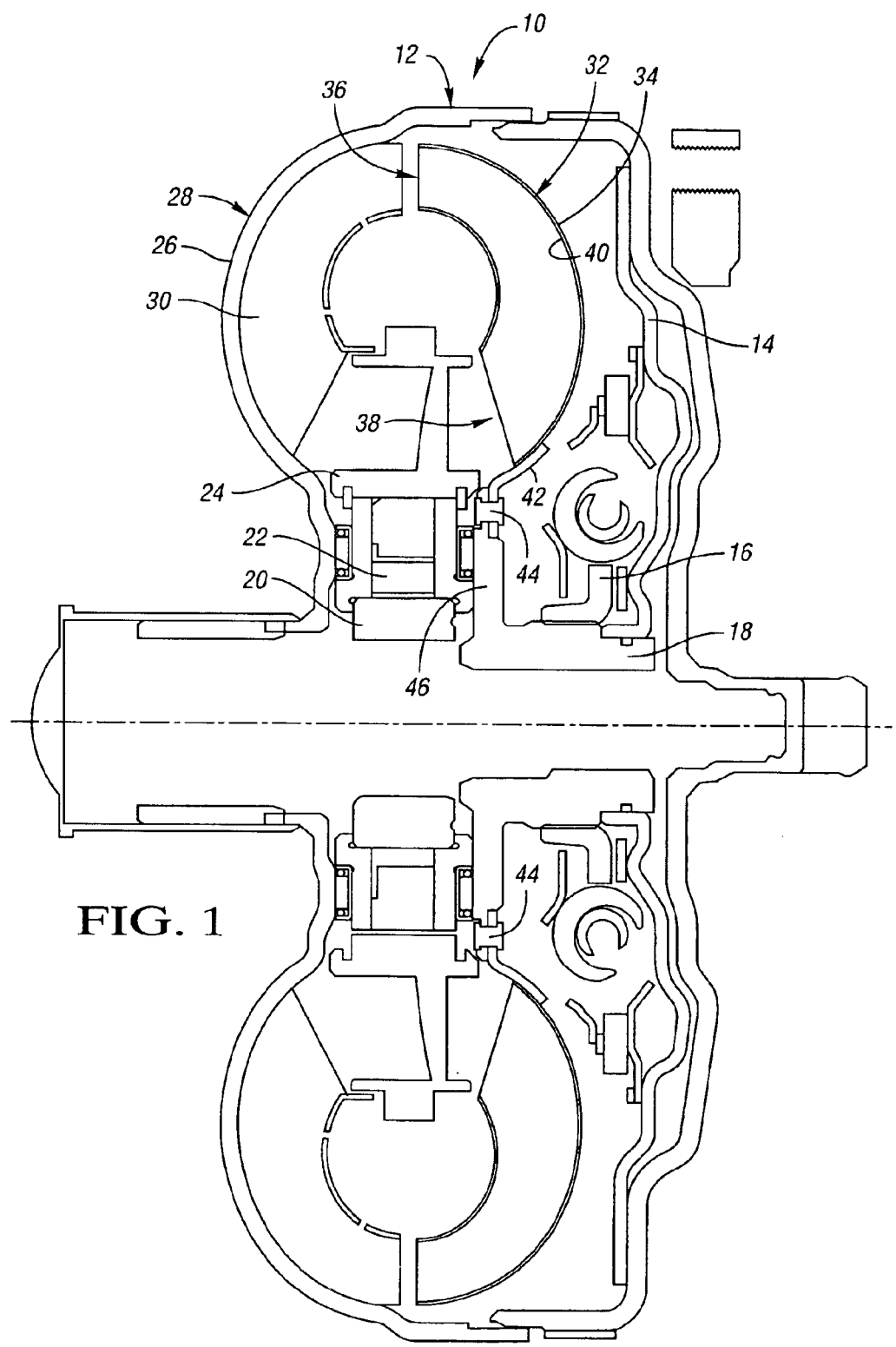
FIG. 1 is a cross-sectional view of a hydrodynamic torque converter having a turbine formed according to the present invention.

Referring first to FIG. 1 of the drawings in detail, numeral 10 generally indicates a hydrodynamic torque converter for use with a transmission in the drivetrain of an automotive vehicle. The torque converter 10 includes a formed outer housing 12 enclosing a lockup clutch 14 connected through a torsion damping coupling 16 with an output hub 18. Coaxial with the hub 18 is a stator hub 20 carrying a one-way clutch 22 that conventionally supports a vaned stator 24. A housing 12 also acts as an outer shell 26 for an impeller 28 forming one hydrodynamic coupling member (a/k/a fluid coupling member) of the torque converter 10. The impeller (pump) 28 conventionally includes stamped blades 30 fixed between the outer shell 26 and a stamped inner shell 31. An improved turbine 32 according to the invention forms a second hydrodynamic coupling (fluid coupling member) of the torque converter 10 and is mounted on the output hub 18, facing the impeller (pump) 28.

In operation, the housing is rotated by an engine, not shown, causing fluid in the torque converter to be orbited and pumped by the impeller 28 into the turbine 32. There it imparts torque to drive the output hub 18, which is connected with the input shaft of a transmission, not shown. The fluid is redirected through the stator 24 to the impeller 28, obtaining torque multiplication in lower vehicle speeds and gradually approaching a unit ratio as vehicle speed is increased, load is reduced, and the stator begins to rotate with the turbine. Engagement of the lockup clutch 14 connects the engine through the torsional coupling 16 and hub 18 directly with the transmission, bypassing the fluid coupling members 28, 32 which rotate together without transmitting torque.

The invention is particularly characterized by the structure and method of manufacturing the turbine 32. Specifically, the turbine 32 is formed by a plurality of hollow tubes 34 which have first and second open ends 36, 38, and an open channel 40 therebetween for carrying fluid from the first end 36 to the second end 38. Each tube 34 is supported by the support ring 42, which is connected by the rivets 44 to the flange 46 of the output hub 18. Other attachment methods, such as welding, may alternatively be used. The rivets 44 which connect the support ring 42 to the flange 46 pass through the holes 48 in the support ring 42, illustrated in FIGS. 3 and 4. Each tube 34 is secured to the support ring 42 by spot welding, tack welding, laser welding, brazing, or other attachment technique.

Figure 3:
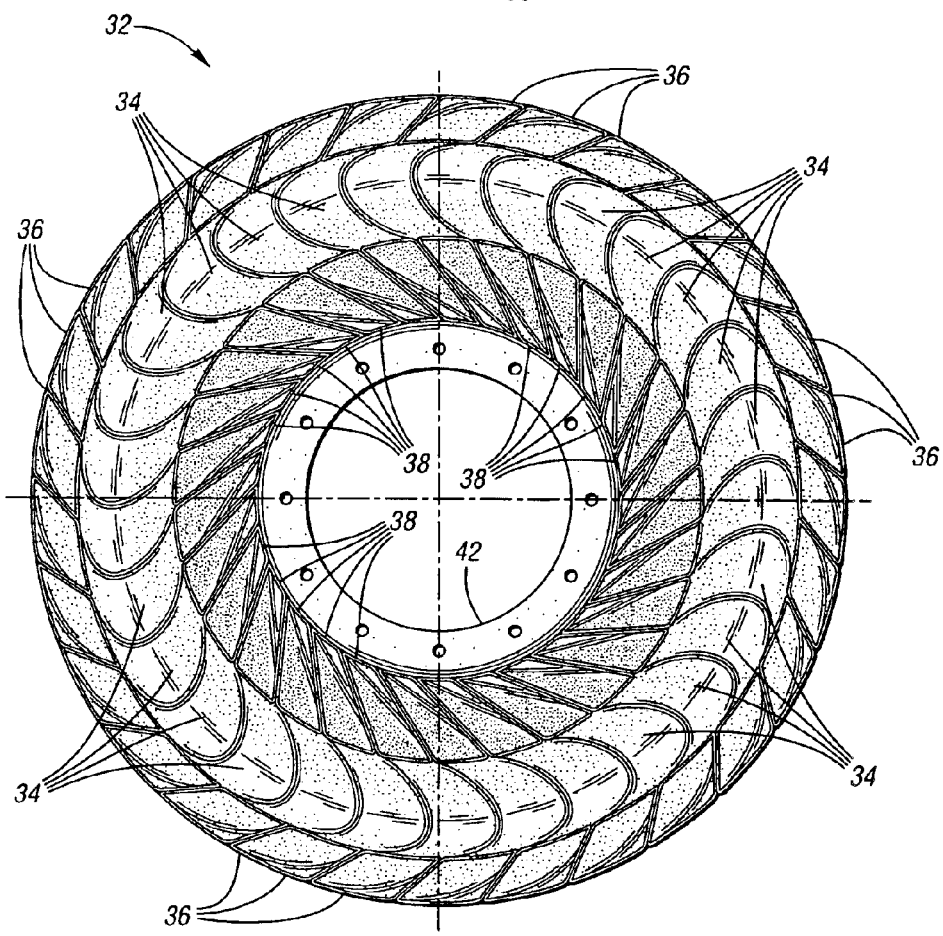
FIG. 3 shows a plan view of the turbine of FIG. 1.
Figure 4:
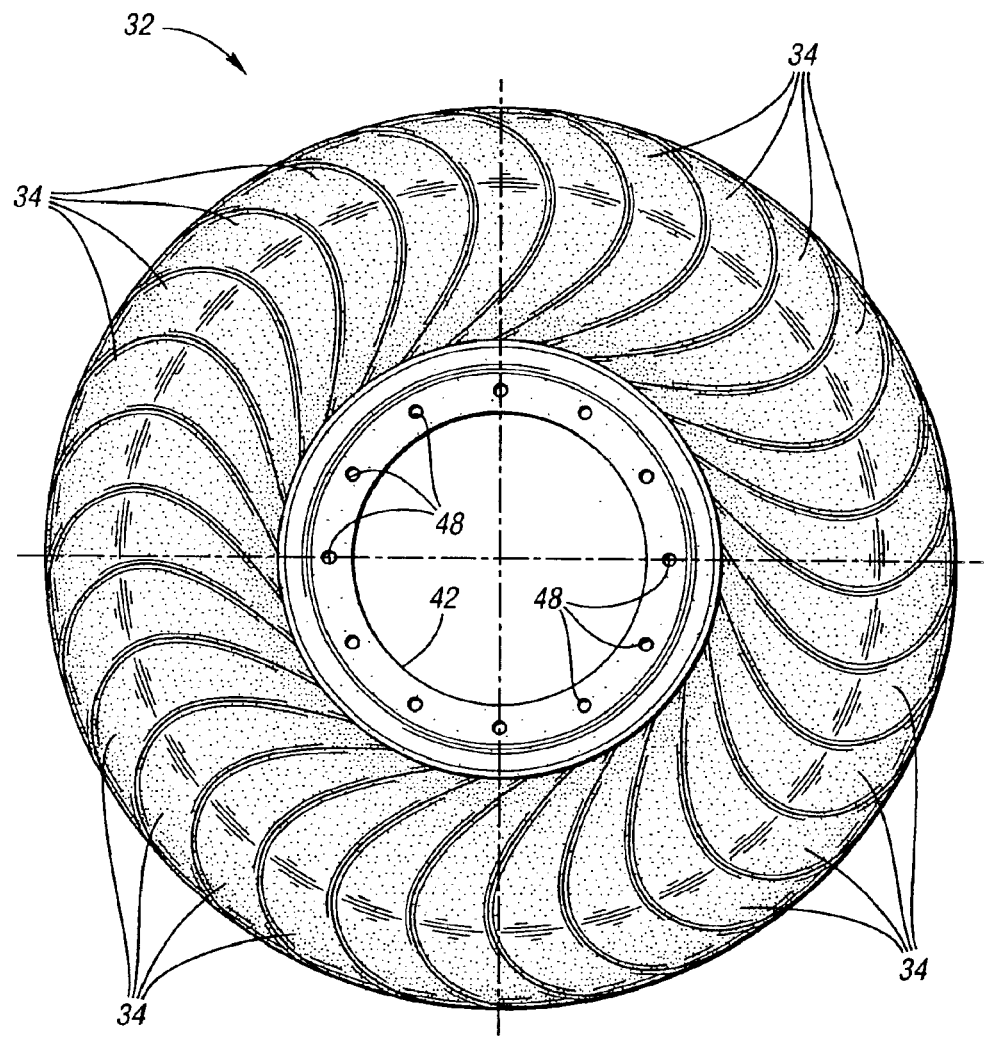
FIG. 4 shows an opposite side plan view of the turbine of FIG. 3.

FIGS. 3 and 4 also illustrate how the tubes 34 are connected together side-by-side in an annular array so that fluid may be carried through each tube 34 from the first end 36 to the second end 38, thereby forming the fluid coupling member. The tubes are nested together so that flowing fluid is carried convolutely through the tubes.

Each tube is formed by a hydroforming process. A tube of low carbon steel, such SAE 1010 or SAE 1020 having a carbon content between 0.06 and 0.10 percent is used to form the tubes. The tubes may be initially round or square in cross section, and are initially smaller than the end part. The tubes may require pre-bending before being inserted into a hydroforming die. Once inserted into the die, at least one end of the tube is connected to receive hydroforming liquid, such as water, while in the die. Before fully closing the die, the tube is filled with the hydroforming liquid. The die is then closed and is configured in a manner to begin shaping the tube. After the die is closed, the pressure of the hydroforming liquid is increased within the die so that the tube is expanded into the desired configuration, as determined by the internal shape of the forming die. This type of high pressure hydroforming typically requires between 15,000 and 30,000 psi of fluid pressure, and preferably approximately 23,000 psi.

Because the initial tubular blank is slightly smaller than the finish part diameter, the tube may be closed in the die cavity without the assistance of pre-pressurization. Subsequently, the substantially higher pressure expands the tube into conformance with the die cavity. The high pressure process stretches the tube material into the corners of the die, completing a process known as superimposed tension bending. The entire cross section of the bend is yielded in tension, thereby eliminating unyielded zones and residual stresses. Any spring-back of the part after removal from the die is negligible because only minimal residual stresses remain in the part.

Figure 2:
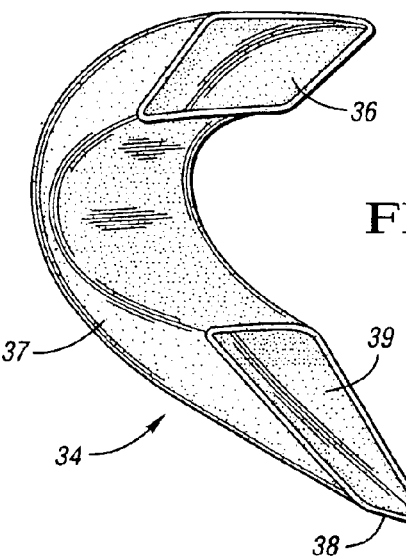
FIG. 2 is a perspective view of a hydroformed hollow tube for use in the turbine of FIG. 1.

As shown in FIG. 2, the resulting sidewall 37 of each tube is formed substantially in the shape of a prior art turbine blade to provide the same functional affect. The opposite wall 39 of the tube 34 has a nearly identical shape as the wall 37.

If necessary, a pre-bending process may include a step of crush bending the tubular blank into a shape that facilitates placement into the next forming tool. Another step of pre-forming may be used to crush the pre-bent tube into a shape that facilitates placement into the hydroforming die.

After hydroforming, the resulting tubes 34 removed from the hydroforming die may have ends which flare out to receive the pressure supply device. Such flared ends would need to be trimmed off. The tubes 34 are then connected together side-by-side in an annular array as illustrated in FIGS. 3 and 4. Each tube is welded to the adjacent tube, such as by tack welding, and each tube is then attached to the ring 42, such as by tack welding, spot welding, laser welding, brazing, etc.

Spot welds which attach the adjacent tubes 34 may only be required along the outer edge of the tubes, and the inner edge may be spot welded to the support ring 42. The support ring 42 is a stamped steel component.

A fixture may be provided to hold all of the tubes and support ring in position to enable spot welding of the tubes and tubes-to-flange while positioned within the fixture.

Preferably, 29 or 31 (prime numbers) of the tubes are provided in each turbine to affect resonance for noise control.

The invention also contemplates that hydroformed tubes could be used to manufacture the pump or impeller 28 to replace the prior art blades and inner shell.

As a result, the prior art inner shell, blades, tabs, tab rollers, brazing process, and progressive machines for stamping inner and outer shells, and blade setter equipment are all eliminated in favor of the hydroforming and welding process. Also, by eliminating the prior art brazing or other methods of attaching the blades to the inner and outer shell, torque converter efficiency may be improved as a result of the elimination of leakage between blades.

Additional details regarding the manufacture of hydrodynamic torque converters may be found in U.S. Pat. No. 6,360,533, which is hereby incorporated by reference in its entirety. Further details regarding the hydroforming of tubular structures may be found in U.S. Pat. No. 6,532,639, which is hereby incorporated by reference in its entirety.

While the best modes for carrying out the invention have been described in detail, those familiar with the art to which this invention relates will recognize various alternative designs and embodiments for practicing the invention within the scope of the appended claims.

What is claimed is:

1. A method of manufacturing a torque converter fluid coupling member comprising:

forming a plurality of hollow tubes having first and second ends; and connecting said plurality of tubes together side-by-side in an annular array such that fluid may be carried through each tube from the first end to the second end, thereby forming the fluid coupling member.

2. The method of claim 1, wherein the torque converter fluid coupling member comprises a turbine.

3. The method of claim 1, wherein the torque converter fluid coupling member comprises a pump.

4. The method of claim 1, wherein said forming step comprises hydroforming.

5. The method of claim 1 wherein said connecting step comprises tack welding ends of adjacent tubes together.

6. The method of claim 1, wherein each said first end is positioned at an inner periphery of the annular array and each said second end is positioned at an outer periphery of the annular array.

7. The method of claim 1, wherein each said first end is positioned at an outer periphery of the annular array and each said second end is positioned at an inner periphery of the annular array.

8. The method of claim 1, wherein each of said tubes comprises a low carbon steel.

9. The method of claim 1, wherein said plurality of tubes comprises a prime number of tubes.

10. The method of claim 2, further comprising welding a support ring to said tubes.

11. A torque converter fluid coupling member comprising:

a plurality of hollow steel tubes connected together side-by-side in an annular array wherein fluid may be carried through each tube from one end to another to form the fluid coupling member.

12. The torque converter fluid coupling member of claim 11, wherein said fluid coupling member comprises a turbine.

13. The torque converter fluid coupling member of claim 11, wherein said fluid coupling member comprises a pump.

14. The torque converter fluid coupling member of claim 11, wherein adjacent ones of said tubes are welded together.

15. The torque converter fluid coupling member of claim 11, wherein a first end of each said tube is positioned at an inner periphery of the annular array and a second end of each said tube is positioned at an outer periphery of the annular array.

16. The torque converter fluid coupling member of claim 11, wherein a first end of each said tube is positioned at an outer periphery of the annular array and a second end of each said tube is positioned at an inner periphery of the annular array.

17. The torque converter fluid coupling member of claim 11, wherein each said tube comprises a low carbon steel.

18. The torque converter fluid coupling member of claim 13, further comprising a support ring connected to said tubes.

19. A torque converter turbine assembly comprising:

a plurality of hydroformed steel tubes connected together side-byside in an annular array such that fluid may be carried through each tube from one end to another;

wherein a first end of each said tube is positioned at an inner periphery of the annular array and a second end of each said tube positioned at an outer periphery of the annular array;

wherein side walls of said tubes are operative as turbine blades; and a turbine hub connected to said tubes.

* * * * *